T. R. ALMOND.
Scroll-Saw Attachment to Lathes
No. 207,150. Patented Aug. 20, 1878.
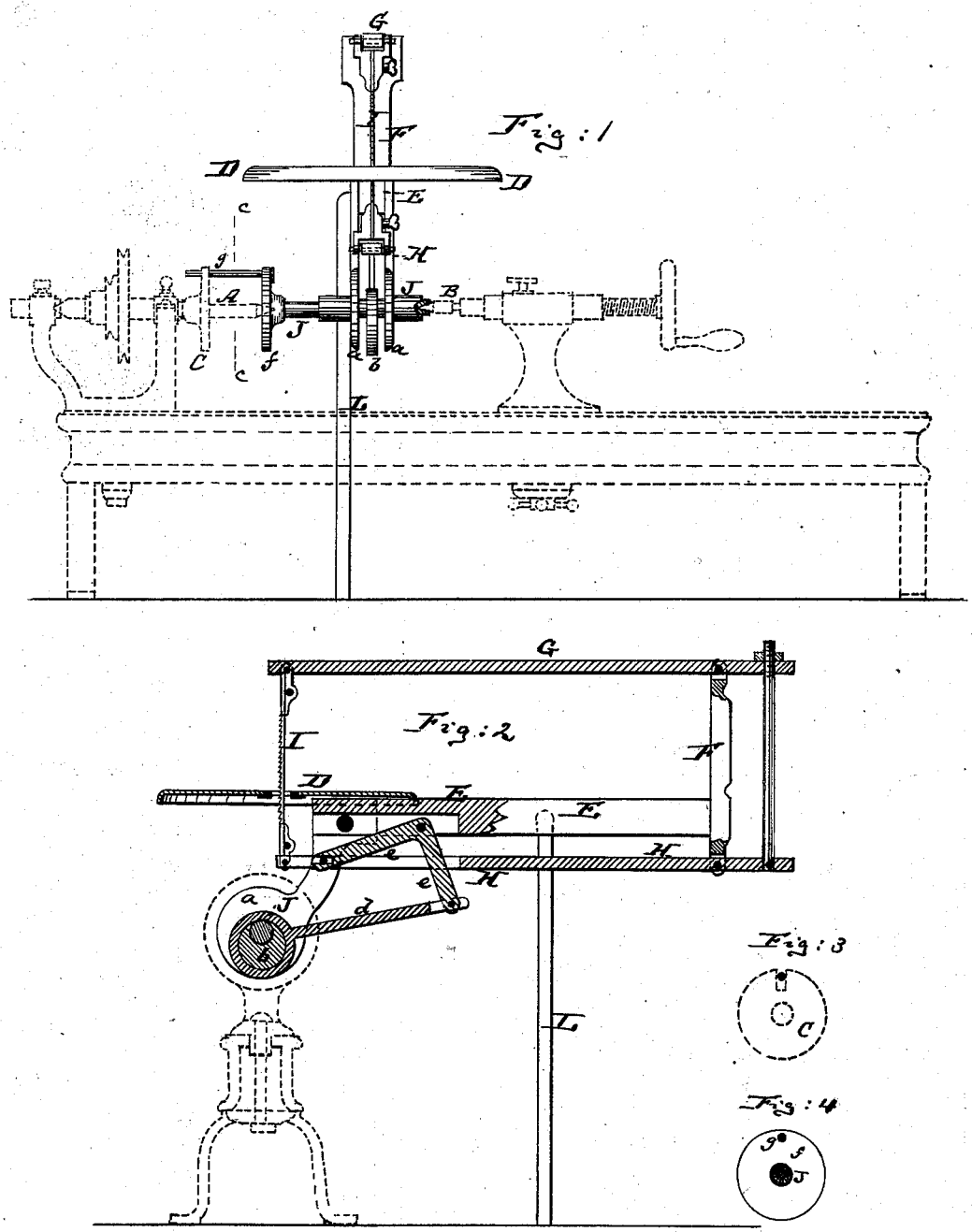
Witnesses
A. v. Briesen
J. Turk
Inventor:
Thos. R. Almond
by his attorney
A. v. Briesen

UNITED STATES PATENT OFFICE.

THOMAS R. ALMOND, OF BROOKLYN, NEW YORK.

IMPROVEMENT IN SCROLL-SAW ATTACHMENTS TO LATHES.

Specification forming part of Letters Patent No. 207,150, dated August 20, 1878; application filed December 10, 1877.

*To all whom it may concern:*

Be it known that I, THOMAS R. ALMOND, of Brooklyn, Kings county, State of New York, have invented a new and useful Improvement in Scroll-Saw Attachments to Lathes, of which the following is a specification:

Figure 1 is a front view of my improved scroll-saw attachment, showing it connected to a lathe, which is illustrated by dotted lines. Fig. 2 is a vertical transverse section of the same; Fig. 3, a cross-section of the line $c\ c$, Fig. 1, looking toward the face-plate of the lathe; and Fig. 4, a cross-section on the same line $c\ c$, looking against the face-plate of the saw attachment.

Similar letters of reference indicate corresponding parts in all the figures.

This invention has for its object to produce for amateurs and others a means of using the live-spindle of a lathe for imparting motion to a sawing-machine—in other words, to dispense with the necessity of having a separate sawing-machine wherever there is a lathe.

The invention consists, principally, in so constructing a sawing-machine with reference particularly to its driving-shaft that it is adapted to be placed in a lathe between the live and dead spindles thereof, and set in motion by moving the live-spindle, in the usual manner.

The invention also consists in other details of improvement, hereinafter more fully pointed out.

The letter A in the drawing represents the live-spindle of a suitable lathe, and B is the dead-spindle of the same. C is the face-plate on the live-spindle, said face-plate being notched, in the usual manner. There is nothing in the lathe which relates to my invention, as I do not propose to change anything in the lathe for the purpose of adapting it to the connection with the saw.

The sawing-machine, which is illustrated by full lines in the drawing, consists of a work-plate, D, which is attached to a beam or frame, E, carrying an upright, F, said upright serving to support two vibrating levers, G and H, in the front ends of which the saw-blade I is secured by suitable means, the said saw passing through the work-plate, as clearly shown in Fig. 2.

In the arms $a\ a$, that extend from the beam E, are the bearings of the driving-shaft J, which shaft carries an eccentric, $b$, that connects by a rod, $d$, with an elbow-lever, $e$, which is hung in the beam E, and is connected to the lever H, so that by rotating the shaft J the saw will be properly reciprocated. But, as far as the idea of constructing a sawing-machine attachment to a lathe is concerned, I desire to state distinctly that I do not confine myself to anything in the means of imparting motion from the driving-shaft J of the attachment to the saw, nor to any special manner of construction of saw or saw mechanism.

The length of the shaft J is such that it may properly fit between the live and dead spindles of a lathe, and the ends of the shaft J are provided with conical cavities, (clearly indicated in Fig. 1,) for receiving the conical ends of the live and dead spindles of the lathe. The shaft J also carries a face-plate, $f$, and on said face-plate an eccentric-pin, $g$. The beam E is furthermore provided with a foot, L, as shown.

For attaching this device to a lathe, it is only necessary to set the shaft J between the live and dead spindles, and then to screw up the dead-spindle, so as to properly hold the shaft in the lathe the same as any other piece of metal would be held in the lathe. The crank $g$ of the face-plate of the shaft J enters in this position the notch of the face-plate of the lathe, as indicated in Figs. 1 and 3, so that when afterward motion is imparted to the live-spindle the shaft J will also be revolved, and motion thereby imparted to the saw. Thus the front part of the saw attachment is supported on the lathe—in fact, by the live and dead spindles—while the back portion of the beam E is supported on the floor or table by the foot L, which may be of proper length.

It is evident that when the ends of the spindles have another than the usual conical shape, the conforming ends of the shaft J will be changed accordingly.

I claim—

1. The saw attachment to a lathe, said attachment having a driving-shaft, J, constructed to fit between the live and dead spindles of a lathe, and provided with the eccentric-pin $g$, for connecting with the face-plate of the lathe, substantially as herein shown and described.

2. In a saw attachment to a lathe, the combination of the supporting-foot L with the shaft J, which has its ends shaped to fit the live and dead spindles of the lathe, substantially as herein shown and described.

3. The combination of the driving-shaft J with the eccentric $b$, rod $d$, elbow-lever $e$, beam E, and saw-lever H, substantially as herein shown and described.

4. The combination of the beam E with the pendent arms $a$ and driving-shaft J, levers G H, and saw I, substantially as specified.

THOS. R. ALMOND.

Witnesses:
T. B. MOSHER,
F. V. BRIESEN.